United States Patent [19]

Lichti

[11] Patent Number: 4,752,175
[45] Date of Patent: Jun. 21, 1988

[54] GRAVITY MOTIVATED VERTICAL LIFT CONVEYOR

[75] Inventor: Robert D. Lichti, Lakewood, Calif.

[73] Assignee: Computer Aided Systems, Inc., Point Richmond, Calif.

[21] Appl. No.: 821,257

[22] Filed: Jan. 22, 1986

[51] Int. Cl.[4] ................................................ B65G 1/12
[52] U.S. Cl. ................................... 414/276; 198/370; 198/435; 198/801
[58] Field of Search ............... 414/268, 269, 271, 272, 414/276–278, 285, 331, 251; 198/347, 797, 798, 801, 477.1, 800, 370, 560, 561, 435, 565, 566, 570; 193/35 A

[56] References Cited

U.S. PATENT DOCUMENTS

| | | | |
|---|---|---|---|
| 844,806 | 2/1907 | Jones | 198/801 X |
| 931,570 | 8/1909 | Courtney | 198/798 |
| 1,525,870 | 2/1925 | Lee | 198/800 X |
| 1,669,497 | 5/1928 | Steegmuller | 193/35 A |
| 2,707,548 | 5/1955 | Fürst | 198/477.1 |
| 3,068,987 | 12/1962 | Franklin | 198/435 X |
| 3,268,055 | 4/1966 | Stein et al. | 198/801 X |
| 3,424,321 | 1/1969 | Lichti | 198/797 X |
| 3,534,850 | 10/1970 | Rogers et al. | 414/276 X |
| 3,547,281 | 12/1970 | Lichti | 414/251 |
| 3,627,110 | 12/1971 | Lichti | 198/798 |
| 3,656,608 | 4/1972 | Lichti | 198/798 |
| 3,750,804 | 8/1973 | Lemelson | 414/278 |
| 3,805,974 | 4/1974 | Andersson et al. | 414/276 |
| 4,018,325 | 4/1977 | Rejsa | 198/347 |
| 4,071,150 | 1/1978 | Thompson et al. | 414/270 |
| 4,168,009 | 9/1979 | Ide | 198/800 X |
| 4,227,607 | 10/1980 | Malavenda | 198/460 |
| 4,239,436 | 12/1980 | Wildenaur | 414/276 |
| 4,307,988 | 12/1981 | Page et al. | 414/276 |
| 4,379,671 | 4/1983 | Cochran | 414/331 |
| 4,389,157 | 6/1983 | Bernard, II et al. | 414/278 X |
| 4,394,104 | 7/1983 | Camerini et al. | 414/276 |
| 4,561,820 | 12/1985 | Matheny, III et al. | 414/331 |

FOREIGN PATENT DOCUMENTS 48306 3/1984 Japan .

Primary Examiner—Joseph E. Valenza
Assistant Examiner—David A. Bucci
Attorney, Agent, or Firm—Flehr, Hohbach, Test, Albritton & Herbert

[57] ABSTRACT

A lift conveyor in the form of an endless chain is mounted on a vertically extending frame and provides a down-travel side and an up-travel side. Fastened to the chain is a progression of evenly spaced shelves for reception of articles to be loaded on and discharged from the conveyor. Each shelf has opposite relatively flat low friction faces for reception of articles so that on the down-travel side of the chain one of the surfaces receives, carries and discharges articles in one direction whereas on the up-travel side it is the opposite face which receives, carries and discharges articles, and in the opposite direction. Each shelf, moreover, has a laterally tilted mounting on the chain so that articles slide by gravity action onto and off the shelf. Removable chocks are used to keep the articles from sliding off the shelf during travel and until the chock is removed at the time of discharge.

18 Claims, 4 Drawing Sheets

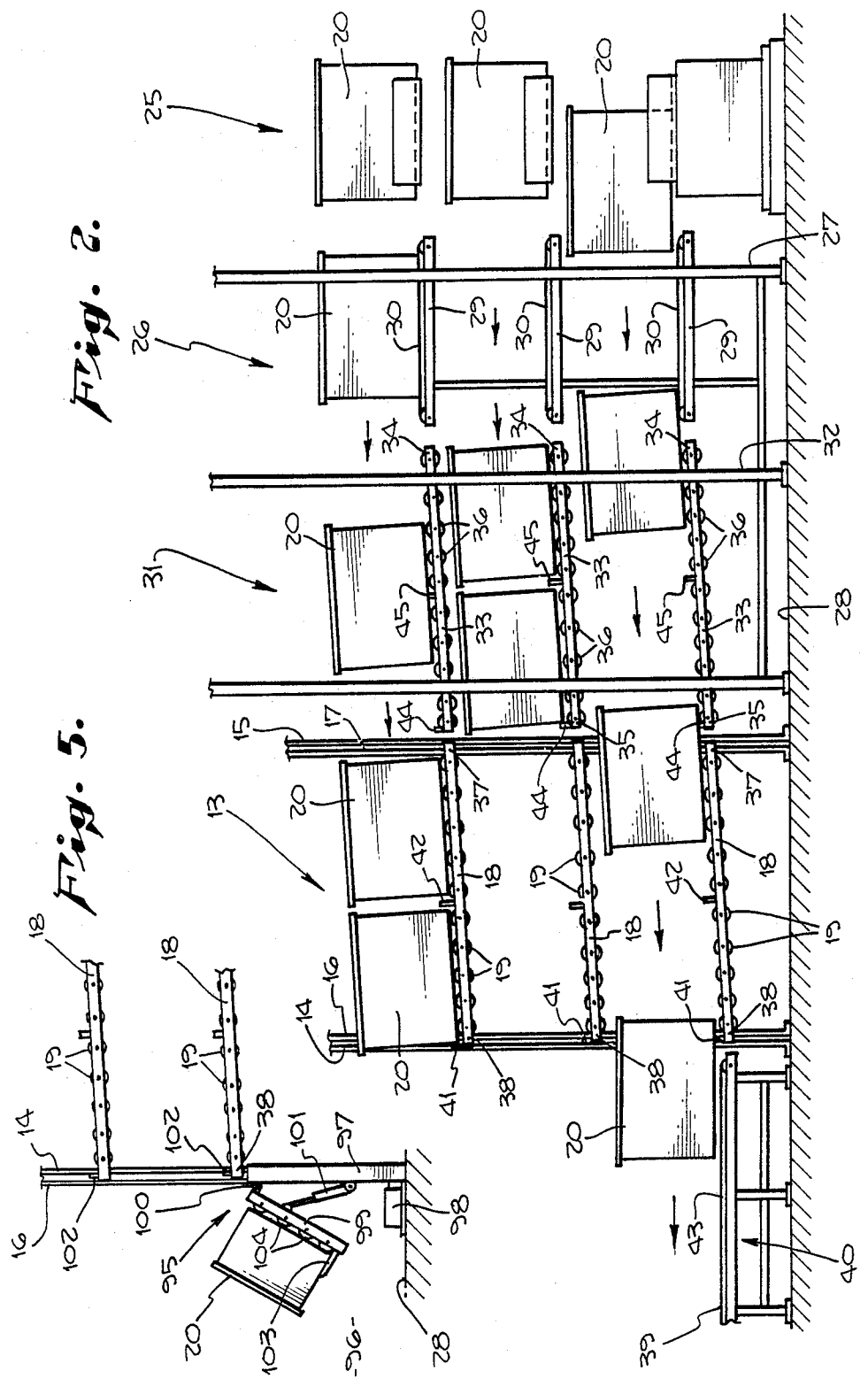

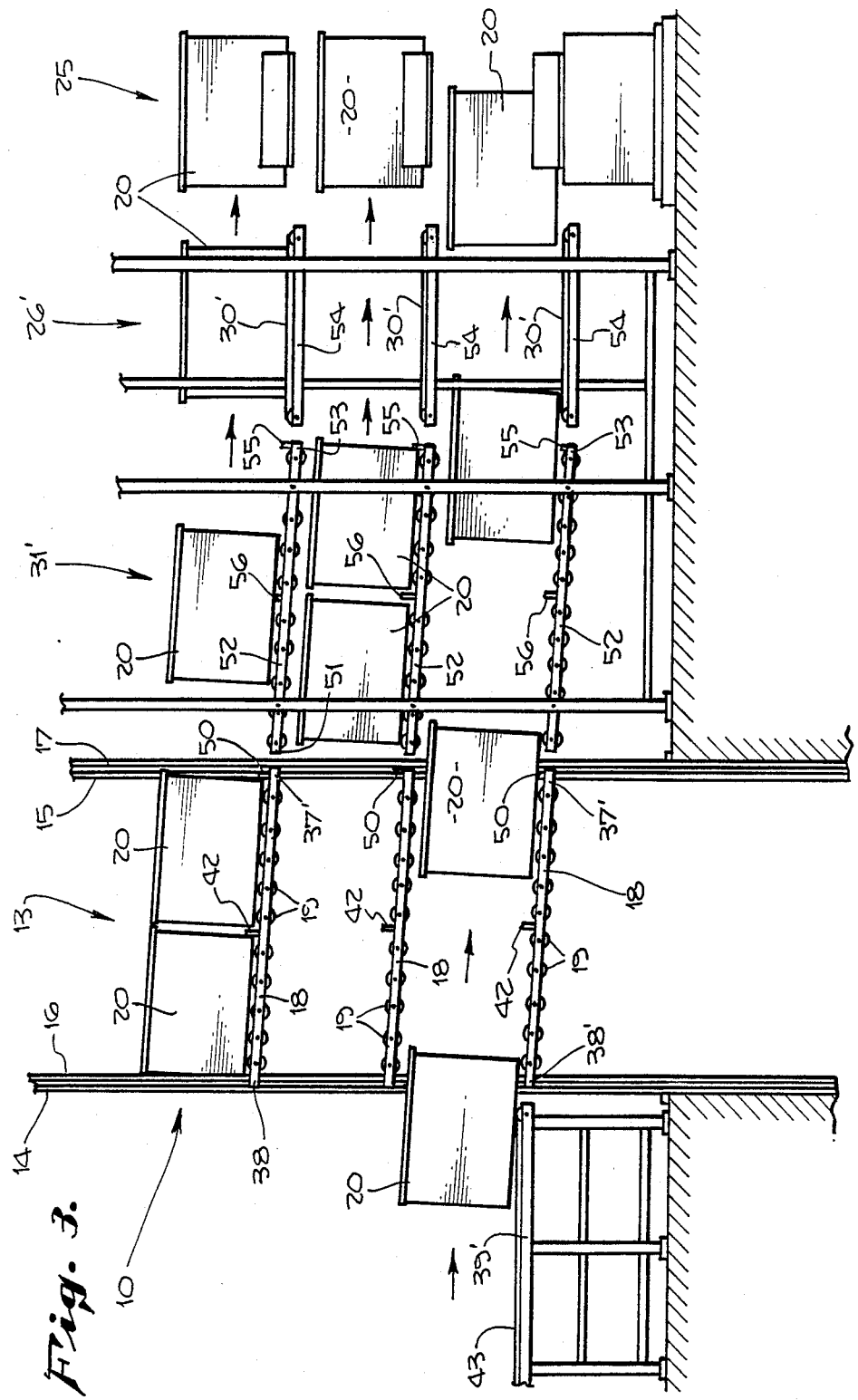

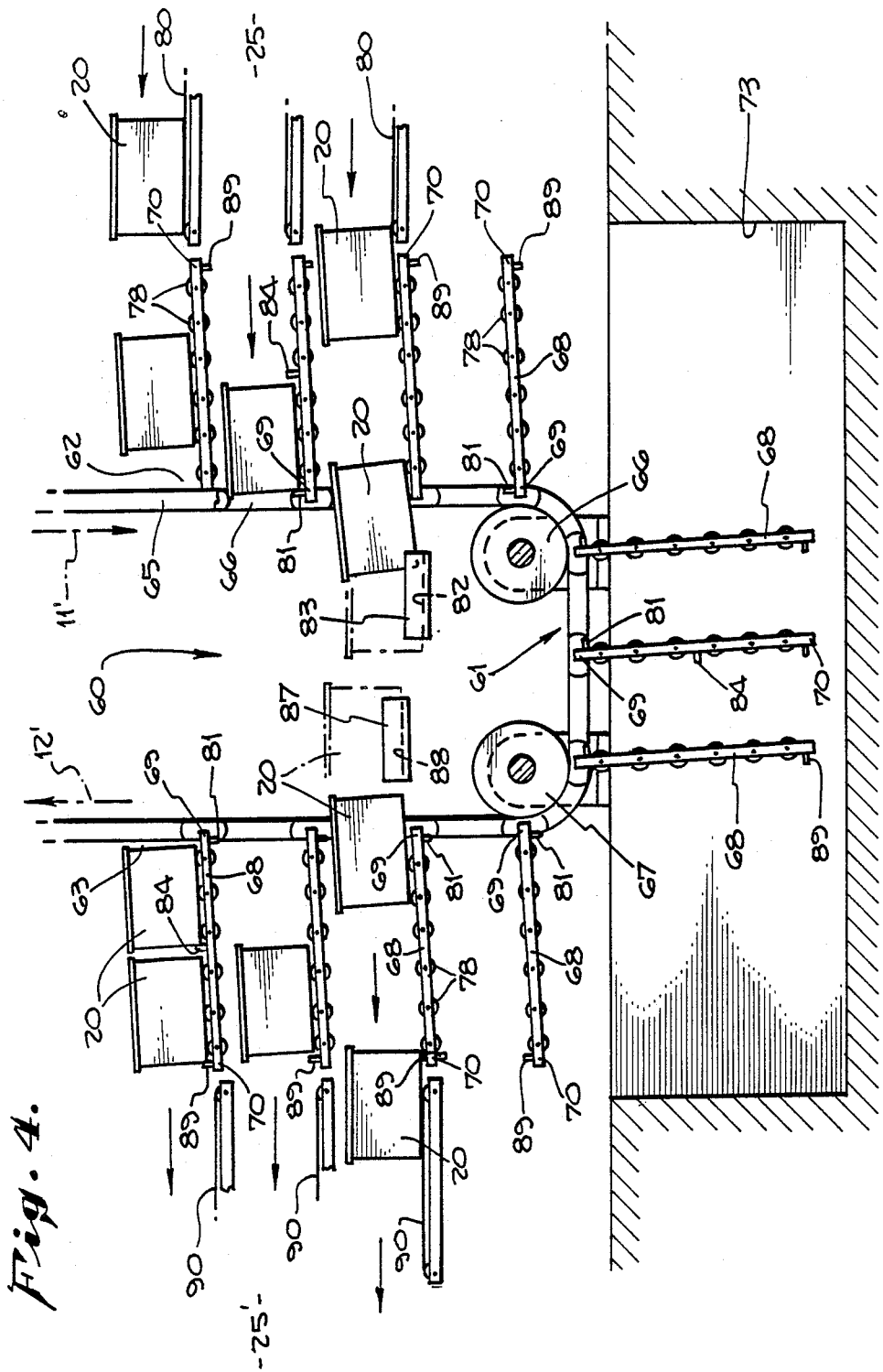

GRAVITY MOTIVATED VERTICAL LIFT CONVEYOR

The field of activity to which the disclosure of a vertical lift conveyor pertains is that of servicing extractor and inserter transfer stations of a multiple level automated storage conveyor which handles box units for the accommodation of material. That phase of the activity which is of special concern is the structure and operation of a lift conveyor which operates, when properly programmed, to accept box units from all levels of the storage conveyor and pass them by gravity motivation to a conveyor array which is used to transport the box units to any one of a variety of work stations. Servicing, as made reference to, includes also return of box units for reinsertion by gravity motivation into the multiple level storage conveyor at any one of the levels.

Multiple level storage conveyors of high density capability have been experiencing a notable increase in demand for not only the storage of inventory, but also the sorting of the inventory for production activity. In some industries, and especially in the electronic industry, by way of example, manufactured items frequently require a multiple assortment of individual parts drawn from an inventory of such capacity that shortages are unlikely to occur. To meet such demands, the trend has been to make use of multiple level motorized storage conveyors having lengths as long as two hundred feet and more with a capacity of some thousands of box units, all of which must be positively identified as to location and capability of recall. Those multiple level storage units heretofore available, although capable of making a dependable delivery of box units, have been operable only at a relatively slow delivery pace.

Among factors limiting the ultimate disposition of stored items has been the inability of available devices to accept box units from the storage conveyor and then to deliver them for disposition at a relatively rapid rate, on some occasions being less than the storage conveyor is capable of delivering. Other limitations are inherent in some storage conveyors which, although automated, are capable of moving box units to an extractor location only on a step-by-step basis. Timing of the step-by-step storage conveyor operation with a step-by-step operation of a vertical type handler has presented problems, especially those related to speed of delivery.

Another disadvantage where handlers are of the mobile type, either on tracks or individually mobile, is the need for an unnecessarily great amount of valuable floor space. Where handlers need appreciable floor space and at the same time are capable of handling only one box unit at a time, the performance becomes intolerably slow in the light of present-day demands for productivity. The disadvantages at the extraction location are equally applicable to the inserter location where box units are required to be reinserted into the storage conveyor.

It is therefore among the objects of the invention to provide a new and improved vertical type handler for use with a multiple level automated storage conveyor which, though operating at a step-by-step rate, can be timed to dependably accept box units from the storage conveyor and dispose of them at an acceptable rapid rate.

Another object of the invention is to provide a new and improved vertical type handler for box units of material from a multiple level storage conveyor which can be stationarily located wherever needed with respect to the storage conveyor structure without impairing its ability to rapidly pass box units between the storage conveyor to an appropriate location for disposition.

Still another object of the invention is to provide a new and improved vertical type handler for a multiple level storage conveyor adapted for continuous rapid operation in a dependable fashion and one virtually assured against stopping at any but the proper location relative to a selected level of the storage conveyor.

Still another object of the invention is to provide a new and improved vertical type handler for box units of material stored on a multiple level storage conveyor which is capable of operating at virtually any desirable rate of speed and adapted to match the capability of the storage conveyor to delivery box units to the handler.

Still further among the objects of the invention is to provide a new and improved vertical type handler operable with a multiple level automated storage conveyor which is of relatively open construction, easily serviced, and wherein parts are non-complicated as a greater assurance of uninterrupted operation.

Still further included among the objects of the invention is to provide a new and improved vertical type handler for material transport units of a multiple level automated storage conveyor in which the handler is provided with shelves with opposite faces, both having a low friction surface for retention of the units when on the handler, movement of units on the surfaces being motivated by gravity, thereby to, in company with the mechanized organization of the handler, operate smoothly and efficiently at a relatively rapid rate and with a relatively low consumption of energy.

With these and other objects in view, the invention consists of the construction, arrangement, and combination of the various parts of the device, serving as an example only of one or more embodiments of the invention, whereby the objects contemplated are attained, as hereinafter disclosed in the specification and drawings, and pointed out in the appended claims.

In the drawings:

FIG. 2 is a side elevational view on the line 2—2 of FIG. 1.

FIG. 3 is a vertical sectional view on the line 3—3 of FIG. 1.

FIG. 4 is a fragmentary side elevational view of a modified form of the invention.

FIG. 5 is a fragmentary side elevational view of another disposal expedient serving the lift conveyor.

Figure 1:
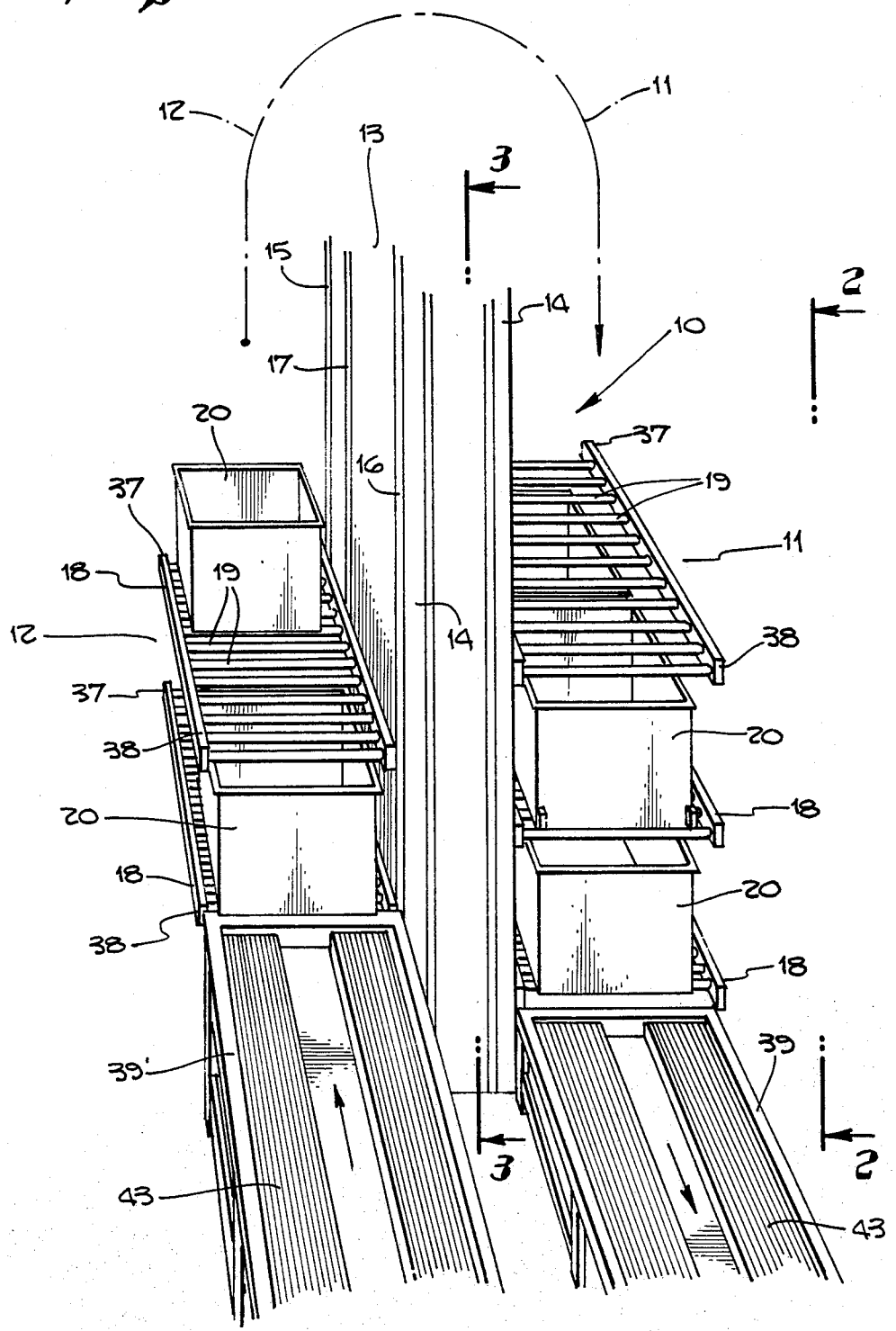
FIG. 1 is a fragmentary front perspective view of the lift conveyor showing portions of both down-travel and up-travel sides.

In an embodiment of the invention chosen for the purpose of illustration, there is shown in FIG. 1 a fragmentary front elevational view of a lift conveyor indicated generally by the reference character 10 whore, for the purpose of illustration, there is a down-travel side 11 and an up-travel side 12. To support the conveyor, there is a vertically standing frame 13 consisting in the main of opposite columns 14 and 15. The conveyor is a substantially conventional endless chain type conveyor with individual chain elements 16 and 17, respectively, in the columns 14 and 15. Spanning the chain elements is a progression of substantially uniformly spaced shelves 18, sometimes referred to as racks, which extend throughout the entire endless length of the chain elements. For each of the shelves there is provided a set of rollers 19 which, as appearing in FIGS. 2 and 3, have a diameter sufficiently large so that the rollers protrude both above and below the shelf 18, thereby to provide a low friction face on both of the opposite sides of the shelves for support of material transport units 20.

For a better appreciation of the operation of the lift conveyor herein disclosed, it should be understood that it is intended to service a rotary storage conveyor which operates on multiple levels. The lift conveyor is designed as one capable of using its down-travel side for taking material transport units 20 from any one of a multiple number of levels and for discharge, moving the units to a specified level, usually the lowest level, where the unit can be transferred to a conventional horizontal conveyor array. Conversely, the opposite or up-travel side of the lift conveyor functions to receive material transfer units 20 at a specified level of the lift conveyor from a conventional conveyor array and then lift them to one level or another of the multiple levels of the rotary conveyor so that the material transfer units can be reinserted into the rotary conveyor at a desired level.

In the embodiment of the invention herein described the rotary conveyor, aptly designated as an automated storage conveyor 25, is depicted at the right extremity of FIGS. 2 and 3, three levels of the conveyor being shown. An automated storage conveyor of the type made reference to is disclosed in appreciable detail in application Ser. No. 732,927, filed May 13, 1985, now abandoned.

For removing units 20 from the rotary conveyor, there is depicted in FIG. 2 an extractor transfer station 26 comprising a vertically extending frame 27 on a supporting surface 28. The frame includes a series of vertically spaced traction shelves 29, equal in number to the levels of the rotary conveyor 25. The traction shelves may, for example, be provided with endless belt conveyors 30 or other appropriate traction means.

Adjacent the extractor transfer station 26 and on the left, as viewed in FIG. 2, there is an extractor transition station, indicated generally by the reference character 31, embodied in a vertically extending frame 32, also supported on the supporting surface 28. In this form of the device the extractor transition station consists in part of a set of vertically spaced gravity motivated transition shelves 33. Horizontal power actuated shelves could be substituted. The transition shelves are equal in number to the traction shelves 29 and span the space between the output end of the belt conveyors 30 and the adjacent ends of the shelves 18 of the lift conveyor 10. It is important to note that for gravity motivation only each transition shelf is obliquely disposed relative to horizontal, having a high end 34 adjacent the output end of the endless belt conveyor 30 and a low end 35 adjacent the corresponding shelf 18 of the lift conveyor 10. Rollers 36, or other appropriate conventional low friction means may be provided to assure travel of the units 20 downwardly with respect to the transition shelf. It is of additional consequence to note that each of the shelves 18 on the lift conveyor 10 is tilted in a direction corresponding to the tilt of the transfer shelves 33 and that a high end 37 of each shelf 18 is at a level coincident with the low end 35 of the corresponding transition shelf 33, the opposite end 38 being the low end of the shelf 18.

In operation, with a structure in keeping with that described, it will be apparent that units 20 from any level of the automated storage conveyor or rotary conveyor 25 may be passed by appropriate means first to the corresponding shelf of the bolt conveyor, then to the corresponding shelf of the transition station, and finally to the corresponding shelf of the lift conveyor 10. On the down-travel side of the lift conveyor the shelves 18, burdened as they are with the weight of the units 20, are moved downwardly by gravity, for example, to the lowest level, as shown in FIG. 2. At that level they pass to a section 39 of a conventional conveyor array 40. On the assumption that units 20 are being taken from the uppermost of the levels pictured in FIG. 2, the units as they leave the transition shelf 29 of the extractor station 26 and are moved onto the transition shelf 33, assisted by the rollers 36, are motivated by gravity to roll from the high end 34 to the low end 35, from there to the high end 37 of the corresponding shelf 18, and thence across the shelf 18, by reason of its tilted disposition, until stopped by an endmost temporary blocker 41. Should the shelf be designed with a width sufficient to support two units 20, an intermediate temporary blocker 42 may be employed to hold the corresponding unit 20 in its own position on the right-hand side of the shelf 18. The shelf 18 with its two units 20 in place is ready to move downwardly to the lowermost or discharge position, as shown in FIG. 2. Once in discharge position, the blocker 41 may have an unblocked position as shown, FIG. 2, and the downhill unit 20 will be free to leave the shelf 18 until engaged by attraction component 43 of the section 39 of the conveyor array 40.

Further still, in those situations where the transition station 31 may be wide enough to accommodate a plurality of units, as suggested in FIG. 2, an endmost temporary blocker 44 may be used to stop movement of the unit 20 in its position on the transition shelf 33 with an intermediate temporary blocker 45 being used to temporarily stop the next unit 20 in its right-hand position on the shelf. When the time comes to move one or both of the units from the transition station, one or both blockers may have an unblocked position to permit the units 20 motivated by gravity to roll down the transition shelf onto the corresponding shelf 18 of the lift conveyor. Should units be taken from the lowermost level of the rotary conveyor 25, substantially the same procedure is followed. It should be apparent that any unit 20, when carried to the adjacent end of the rotary conveyor 25 and passed first to the extractor transfer station 26 and then to one position or another on the extractor transition station, can be released automatically at a selected time to be passed to the lift conveyor 10 and then carried to the discharge position, the lowermost position, as shown in FIG. 2, where again, selectively, it can be passed to the conveyor array.

For those occasions where units 20 are to be reinserted at an inserter station of the rotary conveyor 25, structure as shown in FIG. 3 is made use of. Three levels only are pictured as a matter of convenience since the structural arrangement is equally applicable to however many layers or tiers may chance to be served on the corresponding rotary conveyor 25.

Let it be assumed that for this reinsertion, a section 39' of the conveyor array 40 with its traction component 43 stands slightly higher than the section 39 previously made reference to, which serves the extractor operation. It is also significant to note that the geometry of the lift conveyor 10 and its tilted shelves 18 is such that for the up-travel reach, as on the left side of FIG. 1, the tilt of the shelves 18 will be in the opposite direction. Making reference to one of the shelves 18 merely by way of example, it is significant to note that what was previously the low end 38 of the shelf has now become the high end 38' of the shelf whereas what was previously the high end 37 of the shelf, as viewed in FIG. 2, has now become the low end 37', as viewed in FIG. 3, the reversal in tilt being true of all of the shelves.

On this occasion, as the unit 20 is moved by the traction component 43 onto the corresponding shelf 18, it will travel down the slope of the shelf to a position where it is blocked either by an endmost temporary blocker 50 or one of the intermediate blockers 42. If the units are to be inserted directly onto the lowermost level of the rotary conveyor 25, they merely are motivated by gravity to slide down the shelf 18 and from there to a high end 51 of a corresponding transition shelf 52 and continue traveling, motivated by gravity, to a low end 53 and from there to the appropriate transition shelf 54 which, with its traction belt conveyor 30', moves the unit to the corresponding level of the rotary conveyor 25. In the alternative, it should be appreciated that here also the transition shelf could be mounted horizontally and with rollers on an appropriate endless traction belt power operated.

On those occasions where one or more of the units 20 are to be deposited on a different level of the storage conveyor 25, the lift conveyor 10, then moving throughout its up-travel reach, lifts the corresponding shelf 18 to one or another of the upper levels where, with the lift conveyor momentarily stopping at the appropriate level, blockers 50 and 42 may have unblocked positions to enable, the units motivated by gravity to roll off the shelf 18 to the corresponding upper end of the transition shelves 52 where, if need be, they can be temporarily stopped by either an endmost temporary blocker 55 or an intermediate temporary blocker 56. At the appropriate time, one or both of the blockers 55, 56 may have unblocked positions, allowing units 20, still gravity motivated, to move from the transition station, now an inserter transition station 31', to a transfer station which is now an inserter transfer station 26', and from there to the appropriate level of the rotary conveyor 25.

In a modified form of the invention as shown in FIG. 4, there is a lift conveyor 60 which consists as is customary of an endless chain 61 providing a down-travel side 62 and an up-travel side 63. In keeping with the character of the endless chain needed for the particular performance desired, the chain consists of a pair of opposite chain elements 65 spaced laterally to provide a passageway between them as suggested on opposite sides of FIG. 4, one element being shown in the drawing. On this occasion, the opposite chain elements 65 are spaced apart an ample distance, use being made of right-hand gear wheels 66 at the bottom of the down-travel side and left-hand gear wheels 67 at the bottom of the up-travel side, the right-hand wheels and left-hand wheels being spaced apart, providing an ample distance between the down-travel and up-travel sides. Corresponding right-hand and left-hand gear wheels for the upper ends of the respective down-travel and up-travel sides are not shown.

Throughout the endless chain 61 are a series of shelves 68 substantially uniformly spaced throughout the entire circumference of the endless chain. On this occasion, as may be noted on the down-travel side, the shelves 68 are tilted so that an inside end 69 is lower than an outside end 70. It should be noted that as the shelves 68 travel from the down-travel side, they pass unloaded through a well 73 to the up-travel side, which is on the left of FIG. 4. On the left-hand side the arrangement of shelves is such that the inside end 69 becomes the high end and the outside end 70 becomes the low end, the angle of tilt remaining the same. To provide a low friction face on opposite sides of each of the shelves 68, idler rollers 78 may be made use of, the diameters of the rollers being sufficiently great so that on the down-travel side, the rollers will be exposed above the level of the shelf sufficient to provide a low friction face, the same rollers on the left-hand or up-travel side providing a low friction face on the reverse side of the shelf.

In a manner similar to the form of invention disclosed with respect to FIG. 2, for this modified form endless belt conveyors 80 are arranged to receive units 20 from each of the levels of the rotary conveyor 25. As the unit is deposited on the shelf 68, sloping as it does from the upper outside free end to the lower inside attached end, the unit will be stopped in its position by an appropriate blocker 81. Should there be need to deposit a plurality of units on any one of the shelves 68, additional blockers may be provided like a blocker 84. Irrespective of the level at which the shelf 68 receives one or more units, downward travel on that side of the lift conveyor 60 carries the unit to the chosen lower level, at which level the blocker 81 can be removed from its blocking position, permitting the unit 20 to travel into engagement with a traction element 82 of a section 83 of appropriate conveyor array for dispostiion. Should the general arrangement be one suggesting that opposite sides of the lift conveyor 60 be maintained relatively close together, the section 83 of the conveyor array can be arranged to carry units 20 in a direction at right angles to the line of travel from the shelf 68 to the section 83.

For return of units to an appropriate rotary conveyor 25', there may be provided a section 87 of the conveyor array to bring the units to the lowermost position shown on the left of FIG. 4. At that location, a transversely acting traction conveyor 88 may be employed to divert the units from the section 87 to the inside end 69 of the respective shelf 68 and deposit the units by that expedient on the shelf. The corresponding face of the shelf, being of low friction character, enables the unit by gravity implementation to ride down the face of the shelf from the inside end 69, which is now the high end, to the outside end 70, which is now the low end. At the outside end a blocker 89 may be employed to stop the unit on the shelf if its destination is for some level of the rotary conveyor other than the lowermost level.

It should be appreciated for this transfer of location of the unit that the rotation of the lift conveyor 60 would need to be temporarily halted. Once the unit has been deposited and the movement of the lift conveyor resumed, resulting in up-travel of shelves on the up-travel side, the shelf is moved to a location opposite one or the other of belt conveyors 90. Upon reaching the selected level, the blocker 89 is removed and the unit 20, moving a short distance by gravity implementation far enough to engage the endless belt conveyor 90, is then drawn by the endless belt conveyor into a position at which it can be redeposited on the corresponding level of the rotary conveyor 25. If the unit needs to be deposited upon the lowest level of the rotary conveyor, the corresponding blocker 89 of the shelf 68, when at its lower position as shown, can be withdrawn and the unit 20 accordingly passed immediately to the adjacent endless belt conveyor 90.

Occasions may arise when, as shown in FIG. 5, it is advantageous to deposit a unit 20 directly on a tilt table 95 of an issue/consolidate work station 96. Under those circumstances the section 39 of the conveyor array may be dispensed with. At the appropriate location a support 97 on a base 98 is mounted on the supporting surface 28, with the top of the support located adjacent the low end 38 of the corresponding shelf 18. A low friction frame 99 is provided with a hinged attachment 100 to the end of the shelf. For tilting the frame 99 between the tilted working position of FIG. 5 and an upper receiving position, a ram 101 may be made use of with a lower end attached to the support 97 and an upper end attached to the low friction frame.

By raising the low friction frame to a position where it is substantially in alignment with the oblique disposition of the shelf 18, a unit 20, when released from engagement with the blocker 102 motivated by gravity, slides off the shelf and downwardly on the low friction frame 99 until stopped by a bracket 103. Rollers 104 may be employed for assistance in having the unit 20 move to a lower position against the bracket and the frame, then lowered by the ram 101 to the working position shown. The unit may subsequently be either transferred to the conveyor array or on occasions returned to one of shelves 18 of the lift conveyor.

When the tilt table is employed regularly for an inserter operation, it is mounted adjacent one of the shelves 18 on the up-travel side of the lift conveyor in the same manner. By use of an appropriate transfer conveyor (not shown) it may receive units 20 from the tilt table 99, moved transversely in a direction at a right angle with respect to the tilted disposition of the table. Care must be taken to have a ram 101 with a stroke long enough so that the frame when raised will have an oblique position downwardly toward the shelf. In that way a unit motivated by gravity is enabled to move from the low friction frame 99 to the shelf 18 which can then carry the unit to the desired level for reinsertion on the rotary conveyor as in FIG. 3. Units 20 brought to the same tilt table by other conveyor means may be similarly handled.

In conclusion, it should be appreciated that the vertical type handler as a whole, comprising the subject matter of the disclosure, is one particularly well adapted to a multiple tier storage type conveyor from which material transport units can be accepted at virtually any level of the down-travel side of the lift in the embodiment shown. As many units may be accepted as there are shelves available on the respective side of the handler for transportation to and delivery at the unloading station, the most efficient of which is as expected, the lowermost level. The traction component 43, which is in effect a means for removing the unit from the shelf at the lowermost level, occupies virtually the same position as the shelf, accepting the load from the shelf for either forward or right angle delivery of the unit to an appropriate conveyor, with the traction component constantly operating so that the transfer takes place with a maximum degree of promptness. At the same time virtually as the shelf delivers the unit to the traction component, the now empty shelf continues on the same path of travel, out of the way of the traction component to a position, lowest of those on the up-travel side. In that position it is capable of occupying virtually the same position as another traction component by means of which another unit can be accepted, and immediately thereafter picked up by the waiting shelf for transportation in an upward direction to one of the levels of the same or another multiple level automated storage conveyor.

The vertical type handler, moreover, is of construction enabling as many as may be needed to be installed in a compact arrangement servicing as many multiple level automated storage conveyors as may exist in a given installation. The handlers, moreover, are of such character that they can be installed at both sides or both ends of a storage conveyor if additional speed is needed for delivery of units to the related accessory facility. Moreover, because the handler can be operated at its own individual rate of speed, it remains one capable of being useful in automated storage conveyors, whether those of continuous operation or those of intermittent operation.

While particular embodiments of the present invention have been shown and described, it will be obvious to those skilled in the art that changes and modifications may be made without departing from the invention in its broader aspects and, therefore, the aims of its appended claims are to cover all such changes and modifications as fall within the true spirit and scope of this invention.

Having described the invention, what is claimed as new in support of Letters Patent is as follows:

1. A lift conveyor system for service between a horizontal conveyor of multiple levels for the storage of articles thereon and an auxiliary conveyor array at a selected level for transportation of said articles, said lift conveyor system being an agency for reception, temporary retention of a plurality of said articles at different levels, and discharge of said articles, said lift conveyor system comprising a vertically extending frame having a lower end for mounting upon a supporting surface, an upper end and an endless chain-like carrier having an inside face adjacent the frame and an outside face, a lower loop rotatably supported adjacent the lower end of the frame, an upper loop rotatably supported adjacent the upper end of the frame, and a progression of shelves mounted on the outside face of the carrier at spaced intervals, said carrier having a path of travel embodying a down-travel reach and an up-travel reach, each shelf comprising a low friction face in a substantially flat plane for both reception and discharge of said articles during travel on one only of said reaches, each shelf having the plane of said face in an oblique position relative to horizontal whereby the shelf when traveling said one of said reaches has a first edge in a position at a high end of the plane and a second edge in a position at a low end of the plane, said shelves on said one of said reaches having successive positions at respective levels of the horizontal storage conveyor and having positions successively at the level of the auxiliary conveyor array for exchange of said articles, and blocking means for each said shelf having a blocking position when an edge is at the respective low end of the plane for retention of said articles during travel of said shelves between the levels of the horizontal storage conveyor and the level of the auxiliary conveyor array and an unblocking position for release of articles from the shelf.

2. A lift conveyor system as in claim 1 wherein each shelf comprises opposite substantially parallel low friction faces whereby when traveling the other of said reaches said first edge will have a position at the low end of the plane and said second edge will have a position at the high end of the plane, said blocking means being in operating association with both faces of said shelf.

3. A lift conveyor system as in claim 2 wherein the position of said first edge of the shelf when at the high end of the plane while traveling the down-travel reach is adjacent one side edge of the carrier and the position of said first edge of the shelf while the shelf is traveling the up-travel reach is adjacent the other side edge of the carrier.

4. A lift conveyor system as in claim 2 wherein the position of said first edge of the shelf when at the high end of the plane while traveling the down-travel reach is remote from the carrier and the position of the first edge of the shelf while the shelf is traveling the up-travel reach is adjacent the carrier.

5. A lift conveyor system as in claim 1 wherein there is a transition means adjacent said one of said reaches with at least one low friction section having a low end adjacent the lift conveyor system and an opposite high end for implementing travel of articles to positions on a corresponding shelf by gravity.

6. A lift conveyor system as in claim 5 wherein said section of the transition means includes a blocking means having positions respectively for blocking travel of articles on said low friction section and for release of articles on said low friction section.

7. A lift conveyor system as in claim 2 wherein there is a transition means adjacent the other of said reaches with at least one low friction section having a high end adjacent the lift conveyor system and an opposite low end to implement travel of articles by gravity away from positions on a corresponding shelf.

8. A lift conveyor system as in claim 7 wherein said section of the transition means includes a blocking means having positions respectively for blocking travel of articles on said low friction section and for release of articles on said low friction section.

9. A lift conveyor system as in claim 5 wherein said transition means comprises a plurality of vertically spaced sections with the low end of each section adjacent a respective one of said shelves, there being a section of said transition means in a position serving each respective level of said horizontal conveyor, the high end of the second being adjacent the respective level of the horizontal conveyor.

10. A lift conveyor system as in claim 7 wherein said transition means comprises a plurality of vertically spaced sections with the high end of each section adjacent a respective one of said shelves, there being a section of said transition means in a position serving each respective level of said horizontal conveyor, the low end of the section being adjacent the respective level of the horizontal conveyor.

11. A lift conveyor system as in claim 10 wherein there is a power actuated traction conveyor member in operating engagement between the transition means and the respective level of the storage conveyor.

12. A lift conveyor system as in claim 2 wherein each of said shelves comprises a set of rollers with rollers of each set on parallel axes, portions of said rollers being exposed on both sides of the shelf whereby to comprise said opposite faces.

13. A lift conveyor system as in claim 1 wherein the faces of said shelves have areas comprising a plurality of stations for a corresponding plurality of articles and an individual blocking means between said stations having respective blocking and non-blocking positions.

14. A lift conveyor system as in claim 1 wherein said one of said reaches is a down-travel reach and said other of said reaches is an up-travel reach.

15. A lift conveyor system as in claim 1 wherein the tilt of said shelves is from one lateral side of the outside face of the chain-like carrier to the other lateral side of said outside face.

16. A lift conveyor system as in claim 1 wherein the tilt of said shelves is from an edge of each said shelf remote from said chain-like carrier at an edge of each said shelf adjacent said chain-like conveyor.

17. A lift conveyor as in claim 1 wherein the path of travel of articles to and from the chain-like carrier is across the outside face of said chain-like carrier.

18. A lift conveyor as in claim 1 wherein the path of travel of articles to and from the chain-like carrier is through the chain-like carrier.

* * * * *